Sept. 24, 1963 J. A. McDOUGAL 3,104,741
VEHICLE CONTROL MECHANISM
Filed Dec. 30, 1960
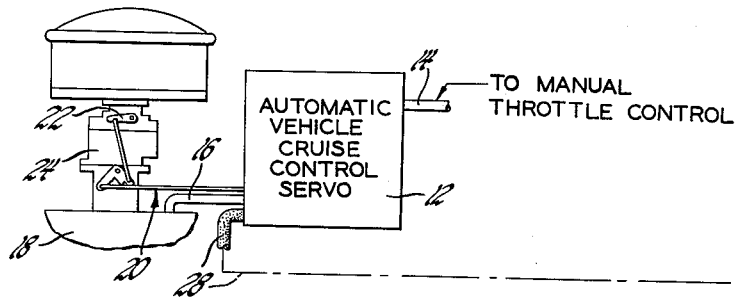
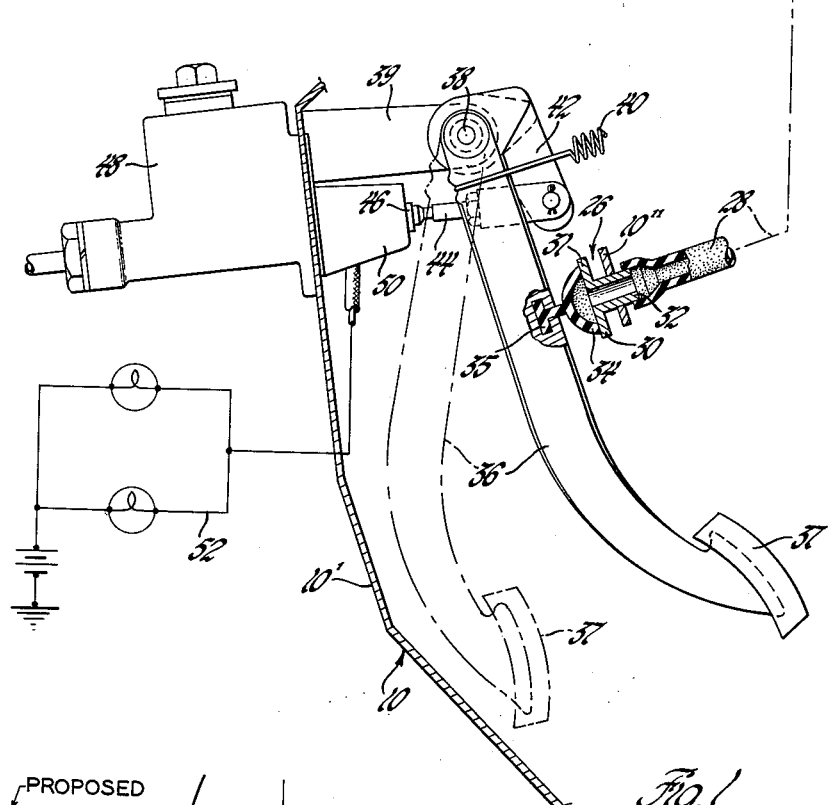
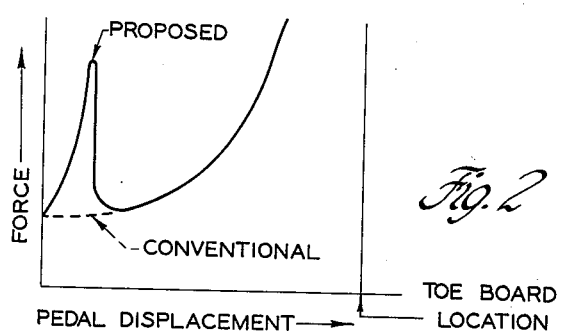
INVENTOR.
John A. McDougal
BY
E. E. James
ATTORNEY

United States Patent Office 3,104,741
Patented Sept. 24, 1963

3,104,741
VEHICLE CONTROL MECHANISM
John A. McDougal, Flint, Mich., assignor to General Motors Corporation, Detroit, Mich., a corporation of Delaware
Filed Dec. 30, 1960, Ser. No. 79,616
7 Claims. (Cl. 192—3)

This invention relates to a motor vehicle; more particularly to a brake actuating mechanism for a motor vehicle; and with regard to certain more specific aspects of the invention to the brake actuating mechanism of a motor vehicle having a cruise or road speed control servo mechanism operable to regulate engine speed to maintain a constant vehicle road speed in accordance with the operator selected position of a manual speed control element.

In modern motor vehicles having automatic type transmissions, there is a tendency on the part of certain operators to unconsciously apply brake actuating pressure to the foot operated brake pedal with resultant intermittent or continuous energization of the vehicle brakes and of the stop indicating brake lights. Such unconscious brake operation necessarily reduces brake life and vehicle operating efficiency and constitutes a safety hazard due to brake fading characteristics and the consequential false stop indicating signals of the vehicle tail lamps. In modern vehicles having road speed cruise control servo mechanisms, such unconscious brake actuation further serves to deenergize the cruise control mechanism thus permitting an undesired return of the fuel controlling mechanism to an engine idle or minimum fuel supplying condition.

In its broader aspects, the invention contemplates modification of the brake lever actuating force to permit the vehicle operator to rest his brake actuating foot on the brake pedal without initiating unconscious braking of the vehicle. This results in safer and more convenient vehicle operation since the brake pedal may be designed and located to provide a convenient foot rest permitting more rapid brake actuation and disengagement of the cruise control system in vehicles so equipped.

These objectives are obtained in an illustrated embodiment of the invention, wherein a vehicle cruise control servo mechanism is normally operable by engine intake vacuum supplied thereto to maintain constant vehicle road speed in accordance with the operator selected position of the speed control element, by providing an engine intake and air pressure modulated brake lever actuated valve which is operable in closed position to substantially increase the initially required brake lever displacement force operating characteristic. Upon movement of the valve to an opened position prior to or during initial brake actuation, the engine intake vacuum supply line through the cruise control servo is relieved to atmospheric pressure thereby restoring further brake lever actuation of a normal displacement force characteristic.

The foregoing and other objects, advantages and features of the invention will be apparent from the following description of the preferred illustrative embodiment having reference to the accompanying drawing, in which:

FIGURE 1 is a somewhat diagrammatic view of a vehicle cruise control system embodying the invention, and FIGURE 2 is a graphical representation contrasting the brake lever displacement and force operating characteristic provided by the form of the invention shown in FIGURE 1 with that of a conventional brake lever mechanism.

Referring more particularly to FIGURE 1, portions of a motor vehicle embodying the invention are indicated generally by the reference numeral 10. This vehicle is provided with an automatic vehicle road speed control servo mechanism 12 which is operable to regulate engine fuel and thereby speed to maintain a constant vehicle speed in accordance with the operator selected position of a manual speed control linkage partially shown at 14. Engine intake vacuum is normally supplied to the speed control servo mechanism 12 through a conduit 16 connected to an engine intake manifold 18. The engine intake vacuum thus supplied provides motive power for actuating an engine speed controlling output linkage 20. This linkage is suitably connected to the throttle valve lever 22 of a carburetor 24 mounted upon and connected to the engine intake manifold 18. The output control of the servo mechanism is connectable to atmosphere through a brake lever controlled vacuum relief valve 26 and a conduit 28 to deenergize the output control servo thus permitting return of the throttle controlling linkage 20 to a minimum fuel supply controlling position.

In the illustrative embodiment, the valve 26 comprises a valve port defining member 30 having a valve seating flange 31 and a nipple portion 32 which is suitably mounted in an underdash vehicle panel member 10" and connected to the end of the vacuum relief line 28 distal from the servo mechanism. The flange of the port defining member 30 is engageable by a suction cup or diaphragm valve member 34. This valve member is suitably secured at 35 to a brake actuating lever 36. The lever 36 is provided with a foot operated pedal 37 at its lower end and is supported adjacent its upper end on a shaft 38 which is in turn pivotally mounted by spaced brackets 39 carried by the engine compartment defining fire wall 10'. The brake lever is movable between a brake disengaged position and a full brake actuated position as shown in full and broken lines, respectively, in FIGURE 1. A spring 40 normally biases the brake lever to its brake disengaged position. A depending bell crank lever is secured to the shaft 38 for movement therewith. This lever arm is connected through an adjustable link 44 to the plunger 46 of a brake actuating master cylinder and reservoir unit indicated at 48. A stop light switch 50 is incorporated into the master cylinder assembly 48 and is operable by movement of the brake actuating plunger to energize the stop light circuit 52 of the vehicle in a conventional manner.

Referring now to FIGURE 2, it will be seen that the biasing action of the spring 40 is augmented by elongation of the suction cup valve member 34 during initial movement of the lever 36 in a brake actuating direction due to the sealing engagement maintained between the valve member and the valve seating flange of the port defining member 30 by the intake vacuum applied thereto. As the brake lever is further depressed approaching an intermediate brake engaging position, the suction cup is carried out of engagement with the flange 31 thus admitting atmospheric air into the vacuum relief line 28. This opening of the suction cup valve member relieves the brake lever from further biasing by the suction cup and deenergizes the output control servo thus permitting return of the throttle control linkage 20 to a minimum fuel supply controlling position during the period of brake engagement.

While the foregoing description has been limited to a single preferred form of the invention, it will be apparent to those skilled in the art that various modifications and changes might be made therefrom without departing from the spirit and scope of the invention as defined in the following claims.

I claim:

1. In a motor vehicle, an engine intake vacuum generating means, a fuel supply controlling means, a vacuum operated cruise control servo mechanism normally operable on said fuel supply controlling means to regulate engine speed to maintain constant vehicle road speed in accordance with the operator selected position of a manual speed control element, a first conduit means for supplying engine intake vacuum to said servo mechanism, vehicle braking means including a brake lever movable between a brake disengaged position and a full brake actuated position, spring means normally biasing said lever to its brake disengaged position, a flanged valve member mounted in said vehicle in juxtaposition to said brake lever, a second conduit means connecting said flanged valve member to said vacuum generating means through said servo mechanism and said vacuum supplying first conduit means, and a suction cup diaphragm valve member carried by said brake lever and normally sealingly engaging said flanged valve member to provide a valve closed position tending to resist initial movement of said brake lever from its brake disengaged position, predetermined displacement of said brake lever from its brake disengaged position carrying said diaphragm valve member to an opened position out of engagement with said flanged valve member thereby venting atmospheric air to said servo mechanism through said second conduit means with resultant actuation of said fuel supply controlling means to a minimum fuel supply condition.

2. In a motor vehicle having an engine intake vacuum operated cruise control servo mechanism normally operable to regulate engine speed to maintain constant vehicle road speed in accordance with the operator selected position of a manual speed control element, vehicle braking means including a brake lever movable between a brake disengaged position and a full brake actuated position, spring means normally biasing said lever to its brake disengaged position, engine intake vacuum generating means, a flanged valve member mounted in said vehicle in juxtaposition to said brake lever, conduit means connecting said flanged valve member to said vacuum generating means, and a suction cup diaphragm valve member carried by said brake lever and normally sealingly engaging said flanged valve member to provide a valve closed position tending to resist initial movement of said brake lever from its brake disengaged position, predetermined displacement of said brake lever from its disengaged position carrying said diaphragm valve member to an opened position out of engagement with said flanged valve member thereby venting atmospheric air through said conduit means to deenergize the engine speed controlling action of said servo mechanism during vehicle braking.

3. In a motor vehicle having a cruise control servo mechanism normally operable to regulate engine speed to maintain constant vehicle road speed in accordance with the operator selected position of a manual speed control element, vehicle braking means including a brake lever movable between a brake disengaged position, an intermediate brake initiating position and a full brake actuated position, spring means normally biasing said lever to its brake disengaged position, means for deenergizing said cruise control mechanism upon predetermined movement of said brake lever between its disengaged and brake initiating positions, and means associated with said brake lever for resisting only said initial predetermined movement from its disengaged position.

4. In a motor vehicle as set forth in claim 3, said last mentioned means including an engine intake vacuum generating means, an orifice defining member mounted in said vehicle in juxtaposition to said brake lever, conduit means connecting said orifice to said vacuum generating means, and a resilient diaphragm valve member carried by said brake lever and sealingly engaging said orifice defining member during said predetermined initial movement of said brake lever from its brake disengaged position.

5. In a motor vehicle, vehicle braking means including a brake lever movable between a brake disengaged position, an intermediate brake engaging position and a full brake actuated position, means normally biasing said lever to its brake disengaged position, engine intake vacuum generating means, a flanged orifice mounted in said vehicle in juxtaposition to said brake lever, conduit means connecting said orifice to said vacuum generating means, and a suction cup diaphragm valve member carried by said brake lever and sealingly engageable with said flanged orifice to resist initial predetermined movement of said brake lever between its brake disengaged and brake engaging positions.

6. A vehicle control mechanism including a foot-operated member movable through a control energizing range between deenergized and fully energized control positions, spring means normally biasing said member toward its deenergized position, and fluid pressure means engageable with said member and operable to apply substantial resistance to actuating movement of said member when in its deenergized position and during initial movement therefrom said fluid pressure means being disengageable from said member during movement through the remainder of its control energizing range thereby permitting the operator's foot to be maintained at rest on said member and requiring conscious and substantially greater operator effort to effect initial control energizing movement of the member than normally required against said spring means through said remainder of its control energizing range of movement.

7. In a vehicle control mechanism as set forth in claim 6, said fluid pressure means including vacuum generating means, an orifice defining member mounted in juxtaposition of said foot-operated member, conduit means connecting said orifice to said vacuum generating means, and a resilient diaphragm carried by one of said members and sealingly engaging the other of said members outwardly of said orifice during initial movement of the foot-operated member from its deenergized control position.

References Cited in the file of this patent

UNITED STATES PATENTS

| | | |
|---|---|---|
| 1,927,643 | Hughes | Sept. 19, 1933 |
| 2,230,742 | Bush | Feb. 4, 1941 |
| 2,243,354 | Musser | May 27, 1941 |
| 2,387,126 | Dillon | Oct. 16, 1945 |
| 2,519,510 | Smith | Aug. 22, 1950 |
| 2,568,481 | Bianca | Sept. 18, 1951 |
| 2,911,078 | Baker | Nov. 3, 1959 |
| 2,982,382 | Strauss | May 2, 1961 |
| 3,005,530 | Fawick | Oct. 24, 1961 |
| 3,023,870 | Udelman | Mar. 6, 1962 |